(12) United States Patent
Krebs et al.

(10) Patent No.: US 6,468,666 B2
(45) Date of Patent: *Oct. 22, 2002

(54) MAGNETIC SUSCEPTIBLE MARKERBOARD

(75) Inventors: Robert R. Krebs, Georgetown, TX (US); Ernest L. Phelps, Waco, TX (US)

(73) Assignee: Premark RWP Holdings, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/444,499

(22) Filed: Nov. 22, 1999

(65) Prior Publication Data

US 2002/0102420 A1 Aug. 1, 2002

(51) Int. Cl.[7] .......................... B32B 15/08; B32B 27/04; B43L 1/00

(52) U.S. Cl. .................. 428/460; 428/461; 428/463; 428/464; 428/900; 434/408; 434/412; 434/413; 434/420; 434/425; 156/307.3; 156/307.4; 156/307.7

(58) Field of Search .................... 428/457, 458, 428/461, 464, 900, 460, 463; 434/408, 412, 413, 420, 425; 156/307.3, 307.4, 307.7

(56) References Cited

U.S. PATENT DOCUMENTS

| 3,654,711 A | * | 4/1972 | Taylor ........................ 434/425 |
| 3,884,771 A | | 5/1975 | Hanabusa et al. .......... 204/112 |
| 3,889,736 A | | 6/1975 | Firks ........................... 160/135 |
| 3,936,575 A | * | 2/1976 | Watanabe et al. ........... 428/417 |

(List continued on next page.)

FOREIGN PATENT DOCUMENTS

| DE | 2025675 | 9/1971 |
| DE | 261702 A | 11/1988 |
| EP | 31701 A2 | 7/1981 |
| EP | 184760 B1 | 6/1986 |
| EP | 301720 A2 | 2/1989 |
| EP | 390999 | 10/1990 |
| EP | 472822 A2 | 3/1992 |
| EP | 708222 B1 | 4/1996 |
| EP | 934977 A1 | 8/1999 |
| EP | 993942 A1 | 4/2000 |
| FR | 2443121 | 6/1980 |
| GB | 2315367 A | 1/1998 |
| JP | 60-25747 | 8/1985 |
| JP | 6201897 | 1/1987 |
| JP | 63286933 | 5/1987 |
| JP | 11-058601 A | * | 3/1999 |

Primary Examiner—Paul Thibodeau
Assistant Examiner—Monique R. Jackson
(74) Attorney, Agent, or Firm—Welsh & Flaxman LLC

(57) ABSTRACT

A magnetically active laminate is disclosed. The magnetically active laminate is composed of a resin impregnated layer bonded to a distinct, magnetically active sheet. The laminate is especially well suited for use in the construction of erasable markerboards and cubicle panels, although many applications are possible within the scope of the present invention.

36 Claims, 2 Drawing Sheets

U.S. PATENT DOCUMENTS

| | | | |
|---|---|---|---|
| 4,364,731 A | | 12/1982 | Norling et al. ............. 433/218 |
| 4,578,308 A | * | 3/1986 | Hani et al. .................. 428/297 |
| 4,584,223 A | * | 4/1986 | Krapf .......................... 428/58 |
| 4,678,707 A | | 7/1987 | Shinozaki et al. .......... 428/323 |
| 4,888,247 A | | 12/1989 | Zweben et al. ............. 428/105 |
| 4,935,281 A | | 6/1990 | Tolbert et al. .............. 428/116 |
| 5,089,348 A | * | 2/1992 | Louderback ................ 428/464 |
| 5,200,853 A | * | 4/1993 | Berkman .................... 359/443 |
| 5,361,164 A | * | 11/1994 | Steliga ....................... 359/455 |
| 5,478,414 A | | 12/1995 | Mozelewski et al. ....... 148/265 |
| 5,480,505 A | | 1/1996 | Andre ........................ 156/201 |
| 5,814,395 A | | 9/1998 | Soellaart-Roelofsen et al. .......................... 428/213 |
| 5,941,713 A | * | 8/1999 | Wayner et al. .............. 434/414 |
| 5,955,203 A | * | 9/1999 | Briggs et al. ............... 428/460 |
| 5,989,668 A | * | 11/1999 | Nelson et al. ................ 428/50 |
| 6,068,041 A | * | 5/2000 | Miles et al. ................ 160/135 |
| 6,165,309 A | * | 12/2000 | Burnell et al. ........... 156/308.2 |
| 6,171,705 B1 | * | 1/2001 | Clifford ..................... 428/464 |
| 6,248,401 B1 | * | 6/2001 | Chiang et al. ........... 427/255.7 |

* cited by examiner

MAGNETIC SUSCEPTIBLE MARKERBOARD

BACKGROUND OF THE INVENTION

1. Field of the Invention

The present invention relates to laminate markerboards. More particularly, the invention relates to a markerboard including magnetic characteristics allowing individuals to adhere decorations, notes or other materials thereto.

2. Description of the Prior Art

Decorative laminates have found wide acceptance within the furniture and building industries. The durability, cost and versatility of decorative laminates make them useful in almost any structural application. For example, decorative laminates are found in everything from flooring products to furniture to countertops.

With this in mind, the laminate industry is continually striving to improve the functionality of decorative laminates. Whether the improvement relates to a locking tongue and groove configuration for decorative laminate flooring panels or improved surface characteristics for a countertop, the advances in decorative laminate manufacturing make these materials equal to, or better than, the materials they are designed to replace.

As most people who have worked in a recently updated office space will appreciate, cubicle systems are very popular. The systems are generally composed of a series of panels connected to create a small semi-private space in which an individual may work. Cubicle systems allow businesses to readily alter a work space to accommodate changing conditions without totaling remodeling the existing work space.

As briefly discussed above, cubicles are constructed from panels selectively connected to create an office. These panels have been formed from metal, fabric covered frames, decorative laminates and wood. Considering the limited space provided in most cubicles, it is desirable to maximize the functionality incorporated into each space.

The ability to post decorations, notes, reminders and various other messages on the walls of the cubicle is one consideration in the use of a cubicle. Where the cubicle is formed from metal, for example, steel, such materials may be readily attached to the walls using magnets. However, metal cubicle panels are very expensive and often present a stark appearance.

Where the cubicle panels are fabric covered panels, workers may secure materials with thumbtacks which, as most will people appreciate, is less than desirable. For example, workers are forced to create holes in each object they desire to hang on their wall and are continually hunting down thumbtacks.

With regard to decorative laminate panels, current panels do not provide a convenient mechanism for securing decorations, notes, reminders and various other messages on the walls of the cubicle. With the foregoing in mind, the inventors have determined that the functionality of decorative laminate panels may be improved by the inclusion of a convenient mechanism for mounting materials to decorative laminate panels.

Prior attempts have been made to produce a magnetically active laminate. The term magnetically active is used throughout the present specification to describe both materials which are magnetically susceptible (i.e., those materials capable of attracting magnetic objects) and materials which exhibit magnetism. However, these attempts have generated limited success. One known laminate disperses a magnetically active material, for example, iron, within a resin impregnated layer. This creates a non-distinct composite layer exhibiting a nonuniform material composition when the layer is viewed on a substantially microscopic level. As a result of the need to disperse the iron within the resin impregnated layer, the prior art laminates are limited by the amount of iron which may be dispersed without adversely effecting the integrity of the resin impregnated layer. These prior art laminates have, therefore, been found to provide unacceptable levels of magnetic attraction.

The inventors have accordingly developed the present decorative laminate panel allowing individuals to readily, conveniently and securely attach magnetic objects to a decorative laminate panel.

Decorative laminates offer a functionality neither metal nor fabric covered panels are able to offer. Specifically, decorative laminates may be used as erasable markerboards. These markerboards are found everywhere from meeting rooms to kitchen refrigerators to dorm room doors.

As with the decorative laminate panels used in the manufacture of cubicles, the functionality of decorative laminate markerboards would be vastly improved by the inclusion of magnetic abilities allowing users to readily and directly attach a variety of materials to the markerboard.

SUMMARY OF THE INVENTION

It is, therefore, an object of the present invention to provide a laminate composed of a first resin impregnated layer and a distinct, magnetically active sheet.

It is also an object of the present invention to provide a laminate composed of a polymer layer, a binding layer and a steel layer.

It is another object of the present invention to provide a laminate including a decorative layer, a first resin impregnated lo core layer, a magnetically active layer and a second resin impregnated core layer.

It is a further object of the present invention to provide a cubicle panel including a magnetically active decorative laminate, a substrate to which the decorative laminate is bonded to form a decorative laminate panel and connecting means coupled to edges of the decorative laminate panel for selectively securing the cubicle panel to adjacent cubicle panels.

It is yet another object of the present invention to provide a magnetic susceptible markerboard constructed from a decorative laminate including an exterior surface permitting the use of the decorative laminate panel as a readily erasable markerboard. The decorative laminate includes a decorative layer having an exterior surface permitting the selective use of the decorative laminate panel as a readily erasable markerboard, a first resin impregnated core layer and a magnetically active layer.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
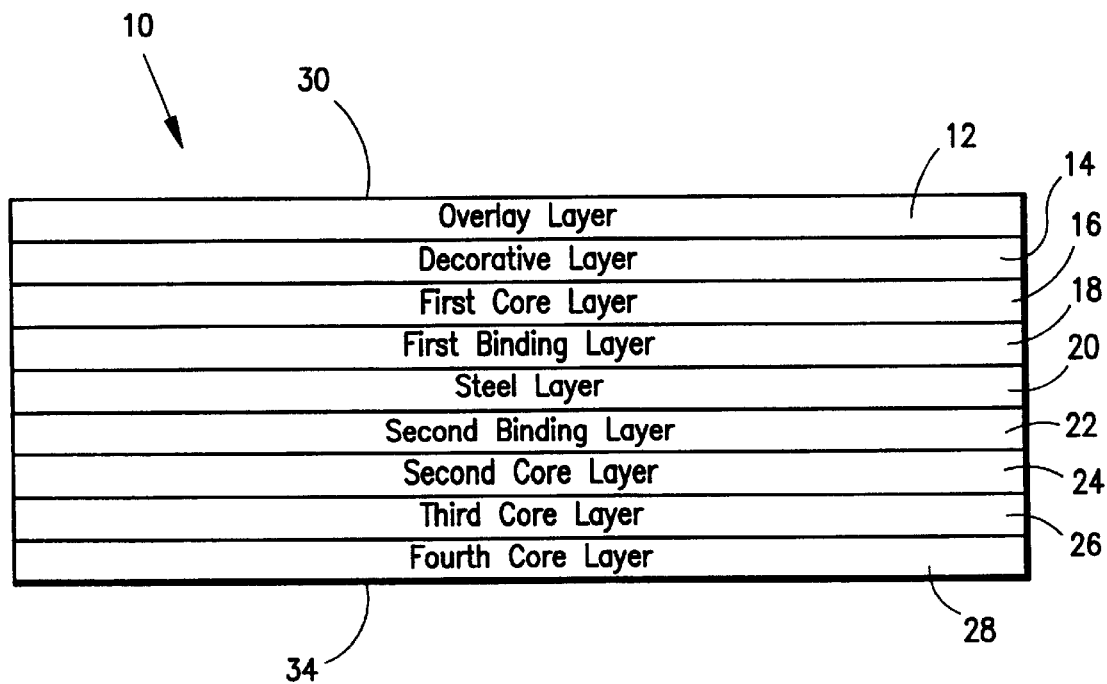
FIG. 1 is a schematic of the decorative laminate in accordance with the present invention.

Referring to FIG. 1, a decorative laminate 10 in accordance with the present invention is disclosed. The decorative laminate 10 includes an exterior overlay paper layer 12, a decorative layer 14, a first core layer 16, a first binding layer 18, a magnetically active steel layer 20, a second binding layer 22 and three concluding core layers 24, 26, 28. While a specific layering pattern is disclosed in accordance with a preferred embodiment of the present invention, the layering pattern may be varied, somewhat, without departing from the spirit of the present invention.

The overlay paper layer 12 is preferably a melamine impregnated paper layer. Once pressed and heated to form a complete decorative laminate, the resin in the overlay paper layer 12 forms a barrier preventing ink from penetrating the exterior surface 30 and reaching the paper fibers (which will not release the ink). The resin, therefore, provides an exterior surface designed to receive ink in a manner allowing for the ready removal therefrom.

It is contemplated that the melamine may be modified in various ways to improve the erasing characteristics of the resulting markerboard. Similarly, it may be advisable to use slightly more resin than might be used in the manufacture of conventional decorative laminates to ensure that no exposed paper fibers extend through the resin coating formed during fabrication. This prevents the direct application of ink to paper fibers which will not readily release the ink. While a melamine impregnated paper layer is used in accordance with the preferred embodiment of the present invention, other known overlays may be used without departing from the spirit of the present invention.

The decorative layer 14 is a conventional pattern sheet positioned directly beneath the overlay paper layer 12. When the laminate is fully heated and pressed, as will be discussed below in greater detail, the overlay paper layer 12 becomes translucent, fully exposing the decorative layer 14. With this in mind, the decorative layer 14 is substantially responsible for the aesthetic appearance of the finished decorative laminate 10. Decorative layers are chosen from a wide array of sheets. For example, the decorative layer 14 may be a solid color (for example, white) or include an aesthetically appealing pattern.

As discussed above, the decorative layer 14 provides the laminate with an attractive appearance. The overlay paper layer 12 and the decorative layer 14 also dictate the surface characteristics of the final decorative laminate 10. For example, the composition of the overlay and decorative layers help to dictate the decorative laminate's resistance to chemical agents, heat, light, shock and abrasion.

Decorative sheets are commonly manufactured from high quality 50–125 ream weight, pigment filled, alpha cellulose paper impregnated with a water alcohol or water solution of melamine-formaldehyde resin. The resin impregnated decorative sheets are subsequently dried, partially cured, and finally cut into sheets. The pigment filled, alpha cellulose paper of the decorative sheet, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate.

The first core layer 16 is preferably a phenolic resin impregnated sheet, although other materials may be used without departing from the spirit of the present invention. More specifically, the first core layer 16 is constructed to be very thin so as to minimize the thickness of the resulting laminate and reduce the spacing between the steel layer 20 and the exterior surface 30 of the laminate. With this in mind, the first core layer 16 includes a sheet of 90–150 pound phenolic resin impregnated kraft paper. The kraft paper is impregnated throughout and bonded with a substantially completely cured phenolic resin which has been converted to a thermoset state during the initial laminating step.

The first binding layer 18 is preferably composed of DYLARK®, a styrene-maleic anhydride copolymer manufactured by NOVA Chemicals, Inc. More preferably, the binding layer is composed of DYLARK® 481. DYLARK® exhibits outstanding bonding characteristics with the phenolic resin impregnated kraft paper making up the first core layer 16. DYLARK® also exhibits outstanding bonding characteristics with the steel layer 20 discussed below in greater detail.

With regard to DYLARK®'s bonding with the phenolic resin impregnated kraft paper, the excellent bonding characteristics are a result of the carboxyl groups found on the maleic anhydride of the DYLARK® copolymer. The carboxyl groups bind with the phenolic resin to produce a very stable laminate. Although DYLARK® is disclosed as a preferred binding layer material in accordance with the present invention, other functionally and structurally equivalent polymers may be used without departing from the spirit of the present invention.

With regard to DYLARK®'s bonding with the steel layer 20, the excellent bonding characteristics may be a result of DYLARK®'s ability to bond with an oxide layer of the steel (see U.S. Pat. No. 4,364,731) or mechanical bonding to microscopic irregularities in the steel surface (see U.S. Pat. No. 5,478,414) or both.

The steel layer 20 is preferably cold rolled steel. The steel layer 20 provides a magnetically active layer. As discussed above, the term magnetically active is used throughout the present specification to describe materials which are magnetically susceptible (i.e., those materials capable of attracting magnetic objects) and materials which exhibit magnetism. As such, magnets 32 may be readily secured to the present laminate 10 without the need for tape, tacks or other attaching devices (see FIG. 2). Where the magnetically active layer is composed of materials exhibiting magnetism in accordance with alternate embodiments of the present invention, magnetically susceptible materials may also be applied to the laminate.

In accordance with the preferred embodiment, the steel is approximately 0.003 inches (0.0076 cm) thick. However, sheet steel has been known to be manufactured in sheets as thin as approximately 0.0005 inches (0.00127 cm) thick, which may be used without departing from the spirit of the present invention. It is further contemplated that the steel layer 20 may be as large as approximately 0.25 inches (0.635 cm) thick, or thicker, without departing from the spirit of the present invention. Ultimately the useful thickness is determined by considering a variety of factors including, but not limited to, whether the thickness will permit the use of conventional laminate working tools, cost, the steel's ability to attract magnets, and the excessive weight added by the inclusion of the steel.

The steel layer 20 is generally provided from vendors with a thin coating of oil to prevent rusting of the steel approximately 0.00354 oz/ft$^2$ (1.08 g/m$^2$). It was first believed that it would be necessary to thoroughly remove the oil before forming the present laminate. However, it has been found that the bonding characteristics of the DYLARK® binding layers 18, 22 are such that the oil need not be removed from the steel to achieve a desired bond between the DYLARK® binding layers 18, 22 and the steel layer 20. This simplifies the production process described below and eliminates environmental concerns associated with waste oil and solvent produced by the cleaning step. It should be noted, however, that excessive amounts of oil on the steel does present a problem and should be avoided.

While cold rolled steel is disclosed as the preferred material for use in the construction of the present decorative laminate 10, other magnetically active materials may be used without departing from the spirit of the present invention. It has been found that good results are achieved where the magnetically active layer takes the form of a distinct magnetically active sheet. The sheet should also have a uniform material composition when viewed on a microscopic level. The distinct layer is contrasted with the non-distinct, composite layer discussed in the Background of the Invention, and provides a level of magnetic attraction unavailable where a magnetically active material is simply dispersed within a resin impregnated layer (as with the prior art laminate).

A second binding layer 22 couples the steel layer 20 to the remaining core layers 24, 26, 28 in the same manner as discussed above with the first binding layer 18. Specifically, the second binding layer 22 is also preferably composed of DYLARK®, a styrene-maleic anhydride copolymer manufactured by NOVA Chemicals, Inc.

Finally, the three core layers 24, 26, 28 extending toward the second side 34 of the decorative laminate 10 are preferably phenolic resin impregnated sheets substantially similar to the first core layer 16 discussed above in greater detail.

In accordance with the present invention, the decorative laminate 10 is formed in much the same manner as conventional decorative laminates. The layers are first stacked and placed between steel plates. The laminate stack is then subjected to temperatures in the range of 250°–320° F. (121° C.–160° C.) and about 800–1600 psi for a time sufficient to consolidate the laminate and cure the resins (generally about 25 minutes to an hour). More specifically, it has been found that satisfactory bonding results are achieved when the laminate stack is subjected to a temperature greater than the glass transition temperature of DYLARK® 481 which is 271° F. (133° C.). In fact, our tests show that pressing at a temperature of approximately 286° F. (141° C.) with 1,000 psi for 20 minutes produces a satisfactory bond, and pressing at a temperature of approximately 304° F. (151° C.) with 1,000 psi for 20 minutes produces an even stronger bond between the phenolic resin layer, the DYLARK® layer and the steel layer.

The pressure and heat force the resin in the paper sheets to flow, cure and consolidate the sheets into a unitary laminated mass referred to in the art as a decorative high pressure laminate. Generally, more than one laminate is formed at one time. Multiple laminates are formed by inserting a plurality of assembled sheets in a stack. Release sheets are positioned between the assembled sheets to separate the various laminates stacked together. After consolidation, the release sheets allow the individual laminates to be separated.

Figure 2:
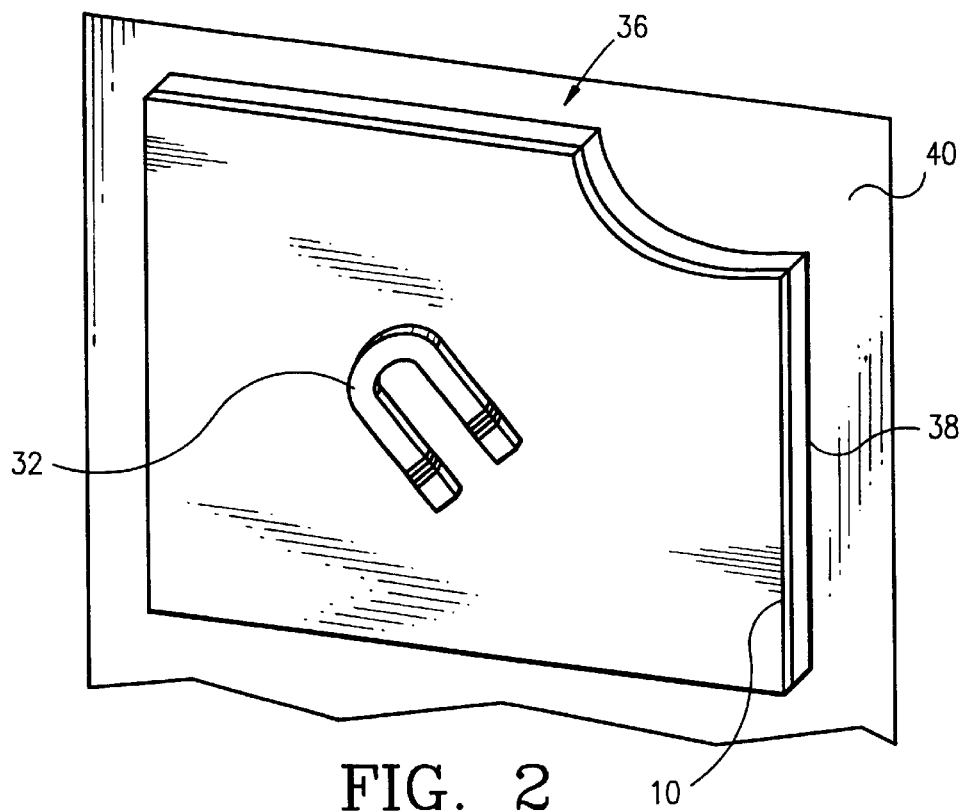
FIG. 2 is a partial cross sectional view of a markerboard in accordance with the present invention.
Figure 3:
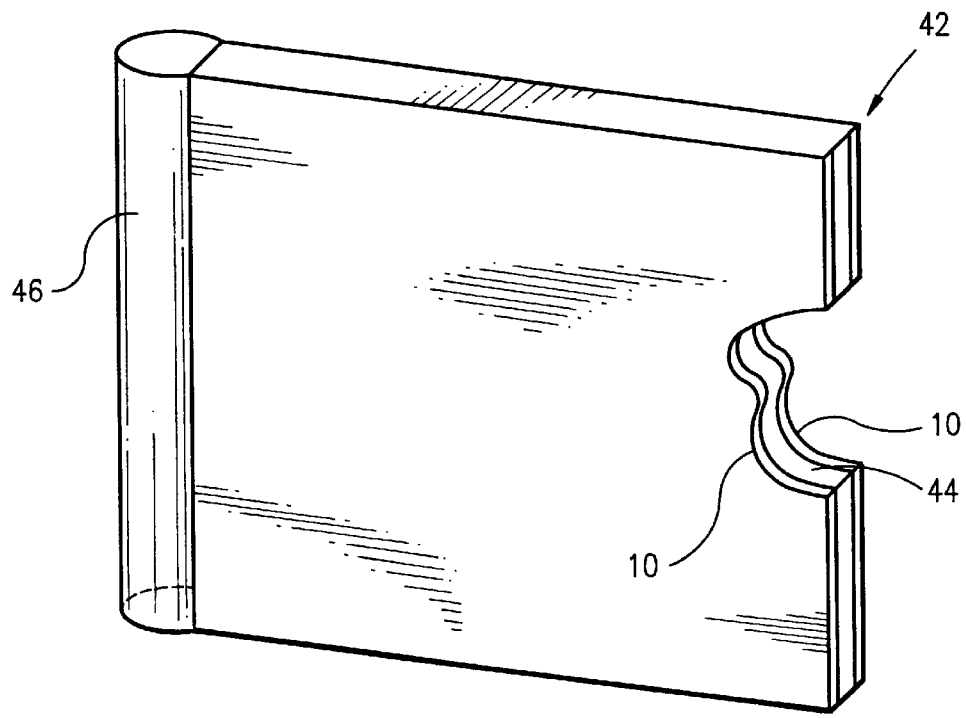
FIG. 3 is a partial cross sectional view of a cubicle panel in accordance with the present invention.

Once formed, and with reference to FIG. 2, the decorative laminate 10 may be used in the construction of a markerboard 36, while also offering magnetic characteristics which allow magnets 32 to be readily secured to the laminate without the need for tape, tacks or other attaching devices. When used as a conventional markerboard, the decorative laminate 10 in accordance with the present invention is simply mounted to a substrate 38 and prepared for mounting to a support surface 40. The exact structure of the substrate is not critical to the present invention, and those skilled in the art will readily appreciate the various structures commonly used to support prior art markerboards.

Where the present decorative laminate 10 is used in the construction of cubicle panels 42 (see FIG. 3), the decorative laminate 10 is adhesively bound to a substrate 44 commonly used in the manufacture of decorative laminate furniture. For example, plywood, particle board, chipboard, and medium density fiberboard are common substrate materials used in the construction of decorative laminate furnishings. Since opposite sides of many cubicle panels function as walls for adjacent cubicles, the decorative laminate 10 may be applied to both sides of the substrate 44. A coupling member 46 is then secured to the opposite edges to complete the construction of the cubicle panel 42.

Once the panel is completed, it may be used in the assembly of convenient, decorative and highly functional cubes in which individuals may work in a semi-private environment. The individuals may mark the walls of their cubicles with readily erasable notes, attached notes with magnets, hang objects with a variety of magnetic hanging devices, etc.

The development of highly versatile decorative laminates as discussed above provides consumers with an affordable, extremely functional product designed to meet the needs of the workplace without sacrificing aesthetic appeal. While the laminates manufactured in accordance with the present invention have been discussed with regard to specific uses, the laminates may be used in a variety of applications, including but not limited to, children's furniture, door cladding, wall panel systems, menu boards, critical care units, lap boards, game boards specially designed for travel, refrigerators, appliance panels, calendars, custom printed graphics, etc.

While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A laminate, comprising:
    a first phenolic resin impregnated layer, wherein the first phenolic resin impregnated layer is composed of phenolic resin impregnated kraft paper,
    a distinct, magnetically active sheet; and
    a first binding layer coupling the first resin impregnated layer to the magnetically active sheet;
    wherein the first binding layer is composed of a copolymer consisting of styrene and maleic anhydride.

2. The laminate according to claim 1, wherein the magnetically active sheet is cold rolled steel.

3. The laminate according to claim 1, wherein the magnetically active sheet is a steel layer a including an oil coating.

4. A laminate, comprising:
a first phenolic resin impregnated layer, wherein the first phenolic resin impregnated layer is composed of phenolic resin impregnated kraft paper;
a magnetically active sheet composed of a substantially distinct material; and
a first binding layer coupling the first resin impregnated layer to the magnetically active sheet;
wherein the first binding layer is composed of a copolymer consisting of styrene and maleic anhydride.

5. The laminate according to claim 4, wherein the magnetically active sheet is cold rolled steel.

6. The laminate according to claim 4, wherein the magnetically active sheet is a steel layer including an oil coating.

7. A laminate, comprising:
a first phenolic resin impregnated layer, wherein the first phenolic resin impregnated layer is composed of phenolic resin impregnated kraft paper,;
a magnetically active layer having a substantially uniform material composition; and
a first binding layer coupling the first resin impregnated layer to the magnetically active layer;
wherein the first binding layer is composed of a copolymer consisting of styrene and maleic anhydride.

8. The laminate according to claim 7, wherein the magnetically active layer is cold rolled steel.

9. The laminate according to claim 7, wherein the magnetically active sheet is a steel layer including an oil coating.

10. A laminate, comprising:
a polymer layer composed of a phenolic resin impregnated layer, wherein the phenolic resin impregnated layer is composed of resin impregnated kraft paper,
a binding layer, and
a steel layer;
a binding layer composed of a copolymer consisting of styrene and maleic anhydride positioned between the polymer layer and the steel layer for ensuring a secure bond between the layers.

11. The laminate according to claim 10, wherein the steel layer is cold rolled steel.

12. The laminate according to claim wherein the steel layer includes an oil coating.

13. A laminate, comprising:
a decorative layer, a first phenolic resin impregnated core layer, wherein the first phenolic resin impregnated layer is composed of phenolic resin impregnated kraft paper,
a second phenolic resin impregnated core layer, wherein the second phenolic resin impregnated layer is composed of phenolic resin impregnated kraft paper,
a magnetically active layer positioned between the first resin impregnated layer and the second resin impregnated layer, and
a first binding layer coupling the first resin impregnated layer to the magnetically active layer, wherein the first binding layer is a copolymer consisting of styrene and maleic anhydride.

14. The laminate according to claim 13, further including a second binding layer coupling the second resin impregnated layer to the magnetically active layer, wherein the second binding layer is a copolymer consisting of styrene and maleic anhydride.

15. The laminate according to claim 13, wherein the magnetically active layer is cold rolled steel.

16. The laminate according to claim 15, further including a second binding layer composed of a copolymer consisting of styrene and maleic anhydride coupling the second resin impregnated layer to the magnetically active.

17. The laminate according to claim 15, wherein the cold rolled steel has a thickness of approximately between approximately 0.0005 inches and approximately 0.25 inches.

18. The laminate according to claim 13, further including an overlay paper bonded to the decorative layer opposite the first resin impregnated layer.

19. The laminate according to claim 18, wherein the overlay paper layer is a melamine impregnated layer permitting use of the decorative laminate panel as a readily erasable markerboard.

20. The laminate according to claim 13, wherein the magnetically active layer is a steel layer including an oil coating.

21. A cubicle panel, comprising:
a decorative laminate including:
a decorative layer,
a phenolic resin impregnated core layer, wherein the phenolic resin impregnated core layer is composed of phenolic resin impregnated kraft paper,
a magnetically active layer; and
a binding layer composed of a copolymer consisting of styrene and maleic anhydride positioned between the core layer and the magnetically active layer;
a substrate to which the decorative laminate is bonded to form a decorative laminate panel; and
connecting means coupled to edges of the decorative laminate panel for selectively securing the cubicle panel to adjacent cubicle panels.

22. The cubicle panel according to claim 21, further including a second binding layer coupling a second resin impregnated layer to the magnetically active layer.

23. The cubicle panel according to claim 22, wherein the second binding layer is composed of a copolymer consisting of styrene and maleic anhydride.

24. The cubicle panel according to claim 21, wherein the magnetically active layer is cold rolled steel.

25. The cubicle panel according to claim 24, wherein the cold rolled steel has a thickness of approximately between approximately 0.0005 inches and approximately 0.25 inches.

26. The cubicle panel according to claim 21, further including an overlay paper layer bonded to the decorative layer opposite the first resin impregnated layer.

27. The cubicle panel according to claim 26, wherein the overlay paper layer is a melamine impregnated layer permitting use of the decorative laminate panel as a readily erasable markerboard.

28. The laminate according to claim 21, wherein the magnetically active layer is a steel layer including an oil coating.

29. A magnetic susceptible markerboard, comprising:
a decorative laminate including an exterior surface permitting the use of the decorative laminate panel as a readily erasable markerboard, the decorative laminate including:
a decorative layer including an exterior surface permitting the selective use of the decorative laminate panel as a readily erasable markerboard;
a first phenolic resin impregnated core layer, wherein the first phenolic resin impregnated layer is composed of resin impregnated kraft paper,
a magnetically active layer, and
a first binding layer composed of a copolymer consisting of styrene and maleic anhydride coupling the first phenolic resin impregnated layer to the magnetically active layer.

30. The markerboard according to claim 29, further including a second binding layer coupling a second resin impregnated layer to the magnetically active layer.

31. The markerboard according to claim 30, wherein the second binding layer is composed of a copolymer consisting of styrene and maleic anhydride.

32. The markerboard according to claim 29, wherein the magnetically active layer is cold rolled steel.

33. The markerboard according to claim 32, wherein the cold rolled steel has a thickness of approximately between approximately 0.0005 inches and approximately 0.25 inches.

34. The markerboard according to claim 29, wherein the decorative laminate further includes an overlay paper layer bonded to the decorative layer opposite the first resin impregnated layer.

35. The markerboard according to claim 34, wherein the overlay paper layer is a melamine impregnated layer permitting use of the decorative laminate panel as a readily erasureable markerboard.

36. The laminate according to claim 29, wherein the magnetically active sheet is a steel layer including an oil coating.

* * * * *